US012798363B2

(12) United States Patent
Bhandari et al.

(10) Patent No.: US 12,798,363 B2
(45) Date of Patent: Nov. 17, 2026

(54) FUEL TANK ISOLATION VALVE WITH SEPARATE SPRINGS AND PATH OF OVER RELIEF FUNCTIONS

(71) Applicant: PADMINI VNA MECHATRONICS LTD., Gurgaon (IN)

(72) Inventors: Kabir Bhandari, Gurgaon (IN); Amardip Kumar, Gurgaon (IN); Varun Kumar, Gurgaon (IN); Sahil Singla, Gurgaon (IN)

(73) Assignee: PADMINI VNA MECHATRONICS LTD, Gurgaon (IN)

( * ) Notice: Subject to any disclaimer, the term of this patent is extended or adjusted under 35 U.S.C. 154(b) by 0 days.

(21) Appl. No.: 17/931,558

(22) Filed: Sep. 13, 2022

(65) Prior Publication Data

US 2024/0083242 A1 Mar. 14, 2024

(51) Int. Cl.
*B60K 15/035* (2006.01)
*B60K 15/03* (2006.01)

(52) U.S. Cl.
CPC .................. *B60K 15/03519* (2013.01); *B60K 2015/03296* (2013.01); *B60K 2015/03302* (2013.01)

(58) Field of Classification Search
CPC .... B60K 15/03519; B60K 2015/03296; B60K 2015/03302
See application file for complete search history.

(56) References Cited

U.S. PATENT DOCUMENTS

| | | | | |
|---|---|---|---|---|
| 7,107,971 | B2 | 9/2006 | Spink et al. | |
| 7,950,373 | B2 | 5/2011 | Hefler et al. | |
| 9,709,006 | B2 | 7/2017 | Peters et al. | |
| 2012/0138610 | A1 | 6/2012 | Lee | |
| 2013/0298880 | A1* | 11/2013 | Pifer | F02M 25/0836 123/520 |
| 2015/0144819 | A1* | 5/2015 | Pifer | F16K 39/024 251/129.15 |
| 2017/0036531 | A1 | 2/2017 | McLauchlan et al. | |
| 2018/0370351 | A1* | 12/2018 | Vulkan | F02M 25/089 |
| 2021/0254583 | A1* | 8/2021 | Brock | F02M 25/0836 |

* cited by examiner

*Primary Examiner* — Patrick C Williams
(74) *Attorney, Agent, or Firm* — S.J. Intellectual Property LTD

(57) ABSTRACT

The improved fuel tank isolation valve (100) with separate springs and path of over relief, comprising of fuel tank valve with a canister port (9) and a tank port (8), a seal sub assembly (5), a seal (3) for over pressure relief (OPR), a spring (1) for over vacuum relief (OVR), a spring (4) for over pressure relief (OPR), solenoid (10), moving core (11), wherein the improved fuel tank isolation valve (100) has a separate section or separate chamber (14) for the seal (3) for over pressure relief (OPR), the spring (1) and the spring (4) to meet the technical requirement of spring within less tolerances that also reduce rejection in production line and reduce magnetic force from solenoid (10) to open the path in refuelling condition which results in high accuracy and the seal sub assembly (5) includes a sealing (6) for refuelling function.

5 Claims, 10 Drawing Sheets

FUEL TANK ISOLATION VALVE WITH SEPARATE SPRINGS AND PATH OF OVER RELIEF FUNCTIONS

FIELD OF THE INVENTION

The present invention relates to a fuel tank isolation valve. More specifically, the present invention is directed towards an improved fuel tank isolation valve with separate springs and path of over relief functions i.e. over pressure relief (OPR) and over vacuum relief (OVR) that results in high accuracy in each function and reduction in installation load spring and magnetic force from solenoid to open the path in refueling condition.

BACKGROUND OF THE INVENTION

A valve is a device for controlling the flow of fluid or gas with the help of a pipe, seal which may be automatic in nature. In automobiles, various types of valves are used including a fuel tank isolation valve (FTIV) that is a crucial unit of an evaporative emission control system for regulating fuel vapor flow from a fuel tank to the carbon canister. The fuel tank isolation valve is generally accumulated with a mechanical bypass to release a certain amount of pressure or vacuum from the fuel tank according to the requirements. The setup of the valve includes connection of one port to the fuel tank of vehicle and other port to the canister of the vehicle. In case of over pressure condition inside the fuel tank, the flow is permitted from fuel tank side to the canister side, whereas on over vacuum condition, the flow is from canister side of the vehicle to tank side of the vehicle and in case of refueling, flow is from tank side to canister side of the automobile.

The fuel tank isolation valve is used in the automobile to maintain the pressure inside the fuel tank within safety limits and this is accomplished by an electrical controlling feature of the valve that helps in handling the vapor flow i.e. Over-Pressure Relief (OPR) and Over-Vacuum Relief (OVR). According to development in automobile, several improvements are done in the fuel tank isolation valve that has resulted in features such as adjustable Over-Pressure Relief (OPR) and Over-Vacuum Relief (OVR), enhanced flow limiter, robust sealing, a wide range of operating temperature and fastest response time. But some drawbacks in the currently available fuel tank isolation valves are more spring installation load is required, a good amount of magnetic forces from the solenoid is required to open the path in refueling condition which leads to a reduction in efficiency of the valve and additionally, these parameters increase the cost of the valve.

U.S. Pat. No. 7,950,373B2 discloses about a check valve for use with a pump is disclosed. The check valve may have a body at least partially defining a central bore with an open end and a closed end, and a spring guide separate from the body and disposed within the closed end of the central bore. The check valve may also have a spring located within the central bore and having a first end operatively engaged with the spring guide, and a valve element operatively engaged with a second end of the spring and being movable by a pressure differential to compress the spring. This invention provides a separate spring guide, but this invention does not work for fuel tank isolation valve and does not have provision of reduction in installation load spring and magnetic force from solenoid to open the path in refueling condition.

Hence, this invention does not provide an optimal, cost friendly solution to achieve high accuracy in each relief function.

U.S. Pat. No. 3,825,027A discloses about a controlled fuel tank control valve assembly is provided for automatically supplying fuel to an engine from one of several fuel tanks connected to the engine through a tank selector valve when the fuel in the selected tank is exhausted. The float controlled valve has a separate chamber containing a ball type float valve for each fuel tank in the fuel supply system. This invention provides a separate chamber to increase the efficiency of the valve but this invention does not work for fuel tank isolation valve and does not have the provision of reduction in installation load spring and magnetic force from the solenoid to open the path in refueling condition. Henceforth, this invention does not provide an optimal, cost friendly solution to achieve high accuracy in each relief function.

Therefore, due to aforementioned drawbacks, there is a need to provide a robust, optimal and cost friendly solution to reduce rejection in production line by introducing an improved fuel tank isolation valve with separate springs and path of over relief functions i.e. over pressure relief (OPR) and over vacuum relief (OVR) to meet the technical requirement of spring within less tolerances, that results in high accuracy in each function and reduction in installation load spring and magnetic force from solenoid to open the path in refueling condition.

OBJECT OF THE INVENTION

The main object of the present invention is to provide an improved fuel tank isolation valve with separate springs and path of over relief functions i.e. over pressure relief (OPR) and over vacuum relief (OVR).

Another object of the present invention is to provide an improved fuel tank isolation valve with separate springs and path of over relief functions to meet the technical requirement of spring within less tolerances.

Yet another object of the present invention is to provide an improved fuel tank isolation valve with separate springs and path of over relief functions that outcomes in reduction in both installation load spring and magnetic force from solenoid to open the path in refueling condition.

Yet another object of the present invention is to provide an improved fuel tank isolation valve with separate springs and path of over relief functions with robust, optimal and cost friendly structure to reduce rejection in production line.

Still another object of the present invention is to provide an improved fuel tank isolation valve with separate springs and path of over relief functions that results in high accuracy in each function.

SUMMARY OF THE INVENTION

The present invention relates to an improved fuel tank isolation valve with separate springs and path of over relief functions that is robust, optimal and cost friendly in structure to reduce rejection in production line which results in high accuracy in each function and meets technical requirement of spring within less tolerances.

In an embodiment, the present invention provides an improved fuel tank isolation valve with separate springs and path of over relief functions comprising of fuel tank valve with a canister port and a tank port, a seal sub assembly, a seal for over pressure relief (OPR), a spring for over vacuum relief (OVR), a spring for over pressure relief (OPR), solenoid, moving core, at least one electrical connector, at least two mounting supports, wherein the improved fuel tank isolation valve has a separate section or separate chamber for the seal for over pressure relief (OPR), the spring for over vacuum relief (OVR) and the spring for over pressure relief (OPR), to meet the technical requirement of spring within less tolerances that also reduce rejection in production line and reduce magnetic force from solenoid to open the path in refueling condition which results in high accuracy and the seal sub assembly includes a sealing for refueling function with a bolted join.

The above objects and advantages of the present invention will become apparent from the hereinafter set forth brief description of the drawings, detailed description of the invention, and claims appended herewith.

BRIEF DESCRIPTION OF THE DRAWINGS

An understanding of improved fuel tank isolation valve with separate springs and path of over relief functions of the present invention may be obtained by reference to the following drawings.

DETAILED DESCRIPTION OF THE INVENTION

Figure 1:
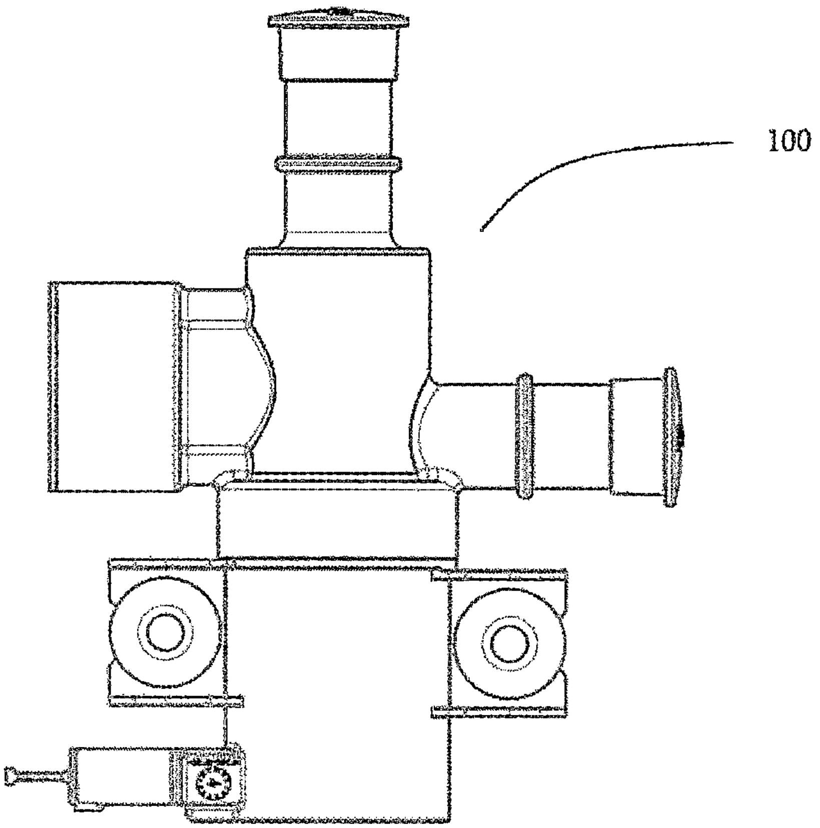
FIG. 1 is an outer view of the improved fuel tank isolation valve with separate springs and path of over relief functions according to an embodiment of the present invention.

The present invention will now be described hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

The present invention provides an improved fuel tank isolation valve with separate springs and path of over relief functions i.e. over pressure relief (OPR) and over vacuum relief (OVR) to meet the technical requirement of spring within less tolerances, that results in high accuracy in each function and reduction in both installation load spring and magnetic force from solenoid to open the path in refueling condition.

Figure 2:
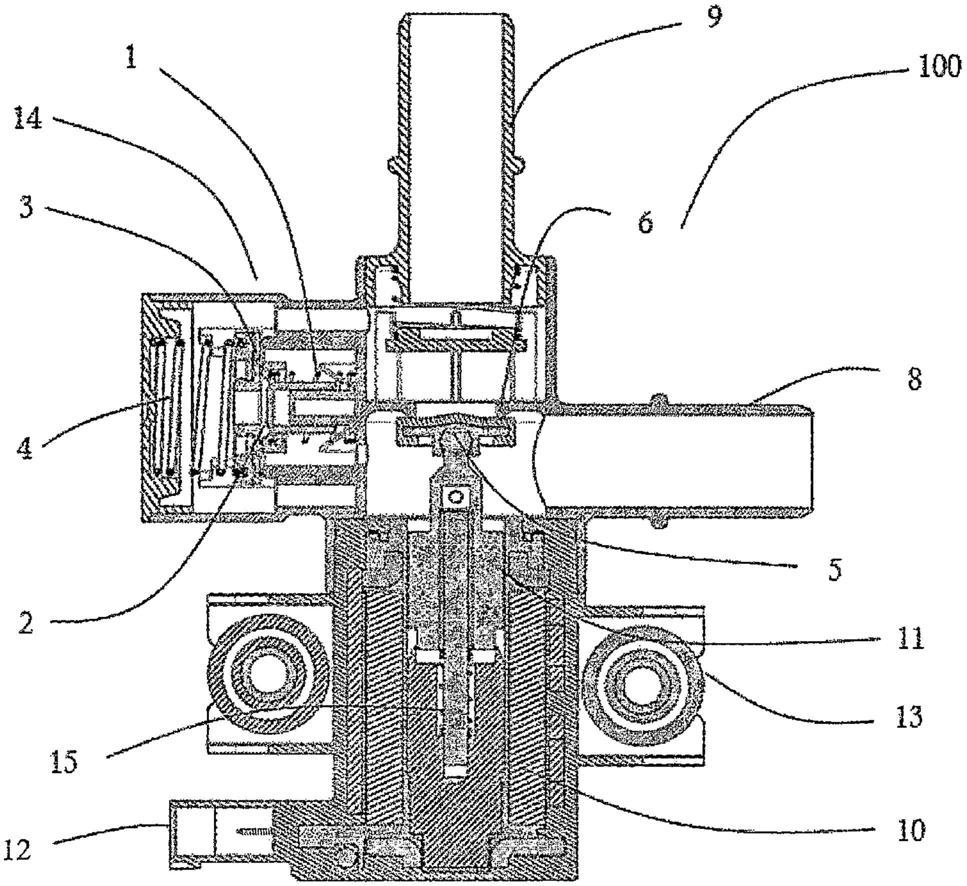
FIG. 2 is a cross sectional view of the improved fuel tank isolation valve with separate springs and path of over relief functions according to an embodiment of the present invention.
Figure 3:
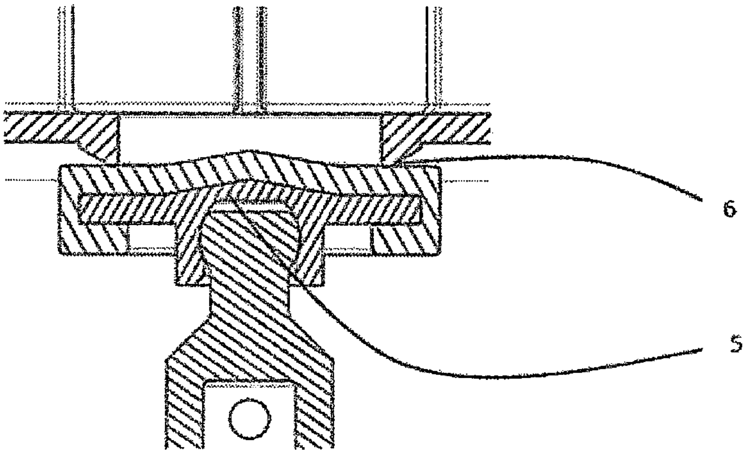
FIG. 3 is a perspective view of seal in the improved fuel tank isolation valve with separate springs and path of over relief functions according to an embodiment of the present invention.

Referring to FIG. 1, an outer view of the improved fuel tank isolation valve with separate springs and path of over relief functions is illustrated. The improved fuel tank isolation valve (100) with separate springs and path of over relief functions is divided into valve section and solenoid section, comprising of fuel tank valve with a canister port (9) and a tank port (8), a seal sub assembly (5), a seal (3) for over pressure relief (OPR), a seal (2) for over vacuum relief (OVR), a spring (1) for over vacuum relief (OVR), a spring (4) for over pressure relief (OPR), solenoid (10), moving core (11), a spring (15) for moving core, at least one electrical connector (12), at least two mounting supports (13), wherein the improved fuel tank isolation valve (100) has a separate section or separate chamber (14) for the seal (3) for over pressure relief (OPR), the spring (1) for over vacuum relief (OVR) and the spring (4) for over pressure relief (OPR) (depicted in FIG. 2), to meet the technical requirement of spring within less tolerances that also reduce rejection in production line and reduce magnetic force from solenoid (10) to open the path in refueling condition which results in high accuracy and the seal sub assembly (5) includes a sealing (6) for refueling function as depicted in FIG. 3.

Figure 4:
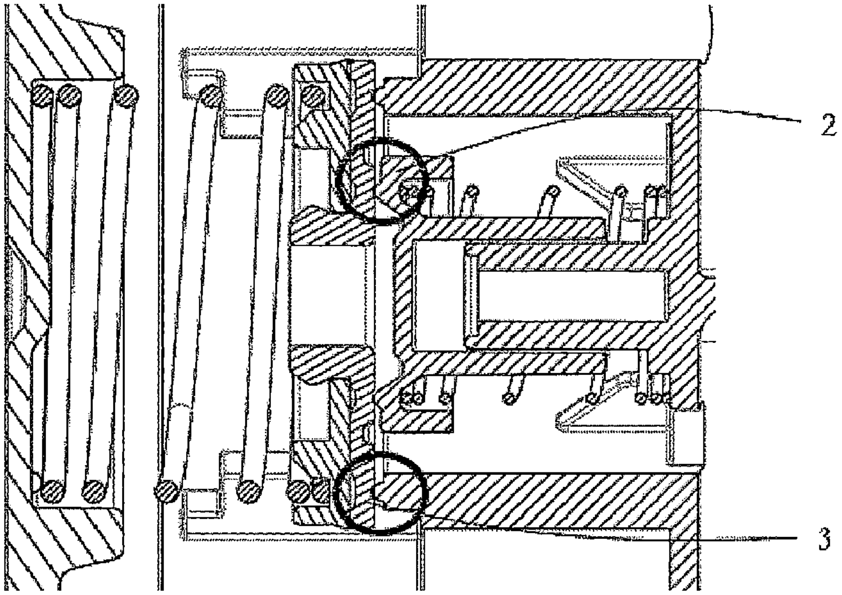
FIG. 4 is perspective view of the separate section or separate chamber of the improved fuel tank isolation valve with separate springs and path of over relief functions according to an embodiment of the present invention.

Referring to FIG. 4, a perspective view of the separate section or separate chamber of the improved fuel tank isolation valve with separate springs and path of over relief functions is illustrated, wherein the separate section or separate chamber (14) comprise of the seal (3) for over pressure relief (OPR) function and the seal (2) for over vacuum relief (OVR) function.

Figure 5:
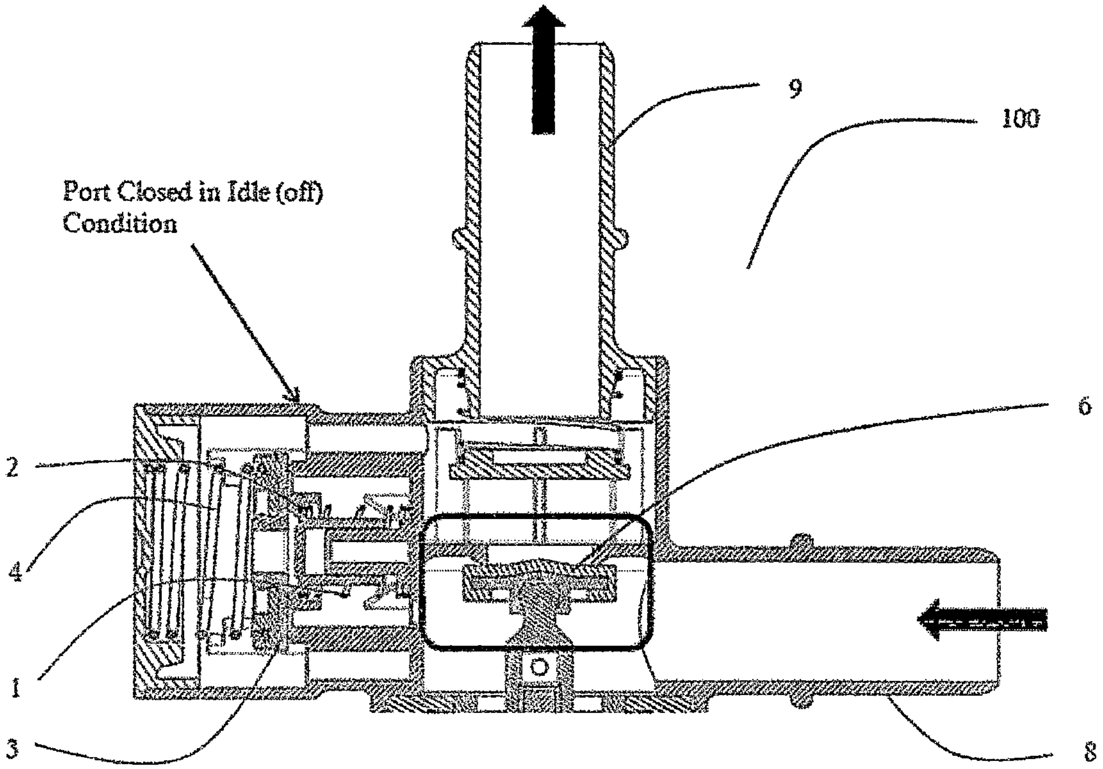
FIG. 5 is perspective view of the improved fuel tank isolation valve in idle condition functions according to an embodiment of the present invention.

In idle condition of the improved fuel tank isolation valve (100), the spring (1) keeps the seal (2) for OVR upwards and attached with the surface of the seal (3). The spring (4) keeps the seal (3) in contact with the surface of seal (2). The spring (15) keeps the seal sub assembly (5) upwards and attached with the surface of the seal (6) and hence preserves the improved fuel tank isolation valve (100). In this way, in idle condition, both the openings are closed and the tank port (8) is not connected to the canister port (9), till the pressure inside the tank is within safety limit, vapors remains inside the fuel tank as depicted in FIG. 5.

Figure 6:
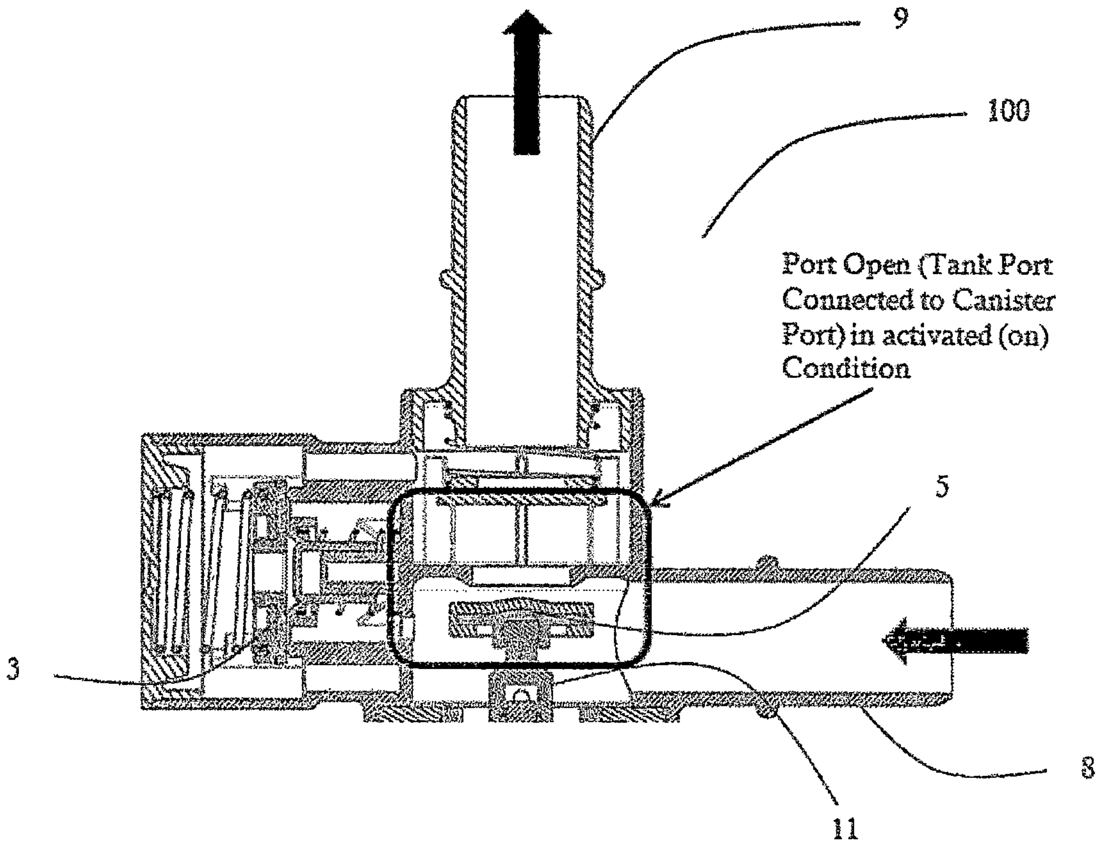
FIGS. 6 and 7, are perspective views of the improved fuel tank isolation valve in ON condition according to an embodiment of the present invention.
Figure 7:
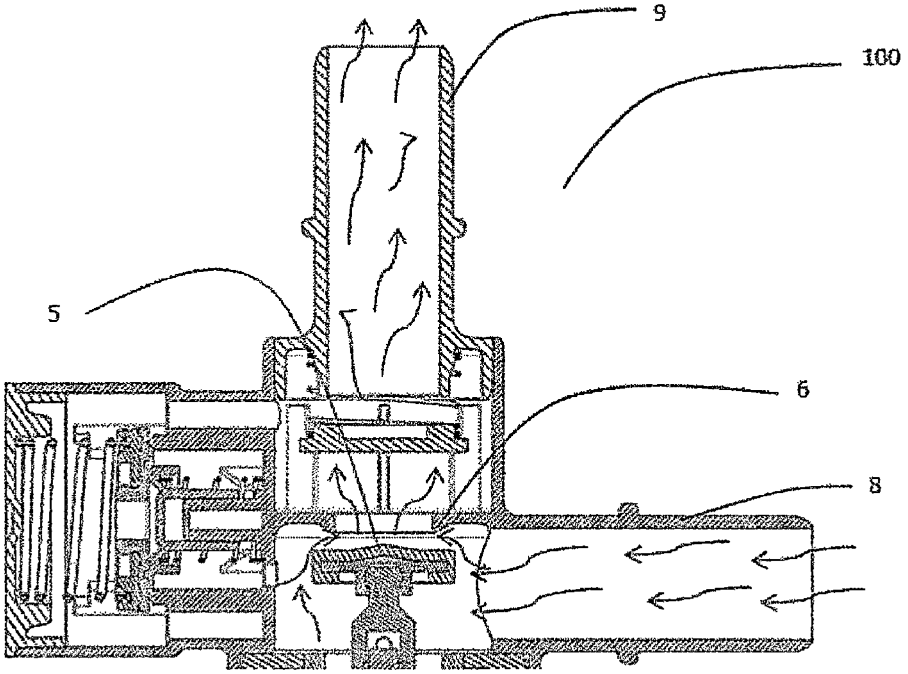

In ON condition of the improved fuel tank isolation valve (100), during refueling, the solenoid (10) is turned ON. Due to the magnetic field moving core (11) move downward causing seal sub assembly (5) open and the seal (3) to remain close because its separate path. At this moment, the moving core (11) force due to magnetic field is greater than spring (15) force. So, due to this magnetic force moving core (11) moves downwards & seal sub assembly (5) gets detached from surface of the seal (6). In this way, port opens and connects the tank port (8) to canister port (9) at the time of actuation during refueling as depicted in FIGS. 6 and 7.

Figure 8:
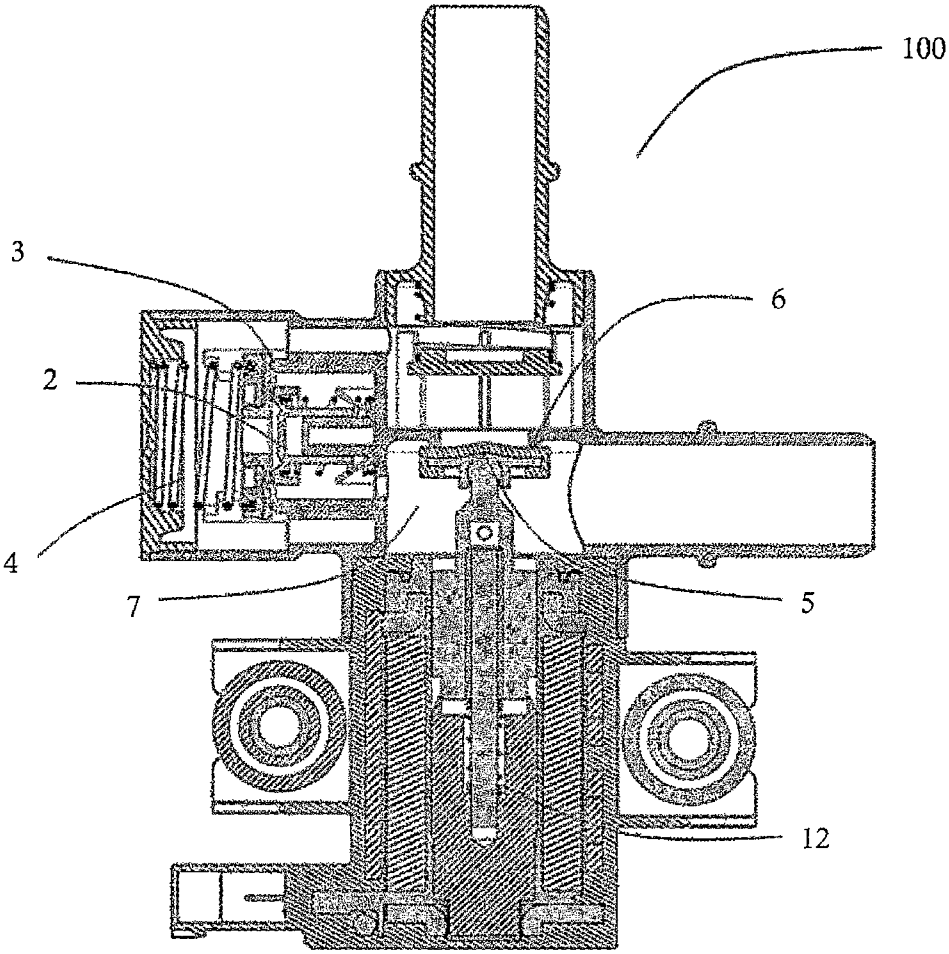
FIGS. 8 to 10 are perspective views of the improved fuel tank isolation valve in working over pressure relief (OPR) condition according to an embodiment of the present invention.
Figure 9:
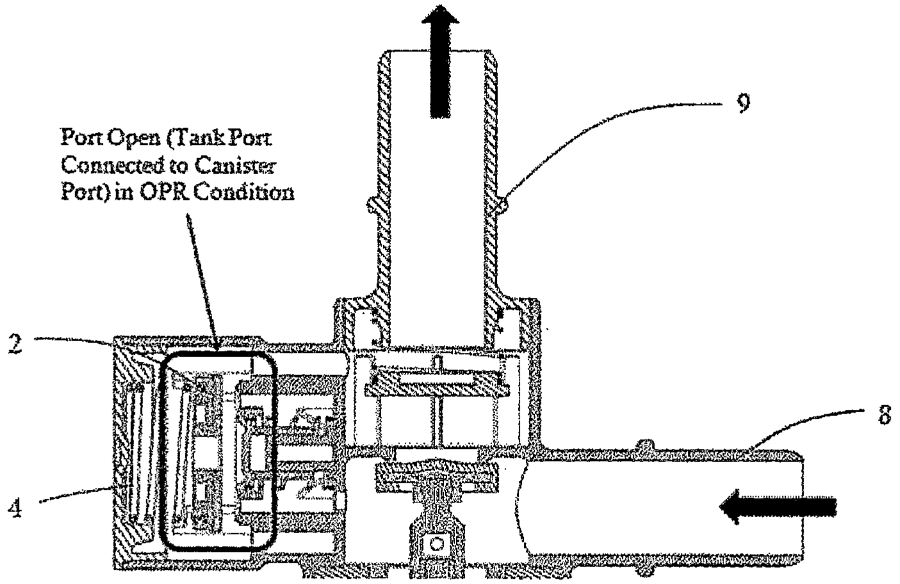
Figure 10:
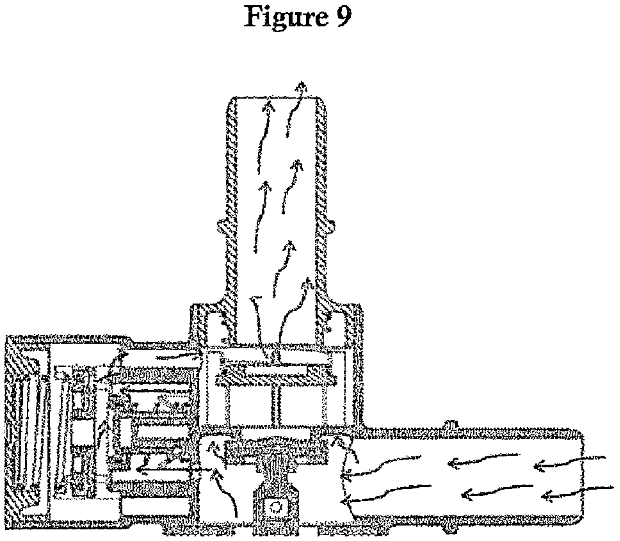

While working in over pressure relief (OPR) condition, pressure is built inside the chamber (7) of the valve (100) and the spring (4) keeps the seal (2) in contact with surface of the seal (3) keeping the improved fuel tank isolation valve (100) in closed condition as depicted in FIG. 8. When the pressure increases beyond the protection point limit, pressure forces compress the spring (4) and lift the seal (2) upwards. Due to the lifting of seal (2), port open and the flow is permitted from tank port (8) to canister port (9). During opening, excess fuel vapors move toward the canister and when the pressure again comes down the safety limit, the port closes as depicted in FIGS. 9 and 10.

Figure 11:
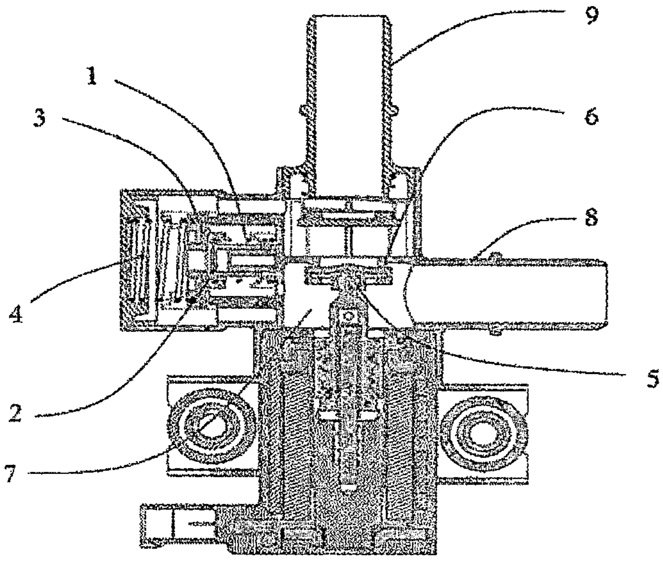
FIGS. 11 to 13 are perspective views of the improved fuel tank isolation valve in working over vacuum relief (OVR) condition according to an embodiment of the present invention.
Figure 12:
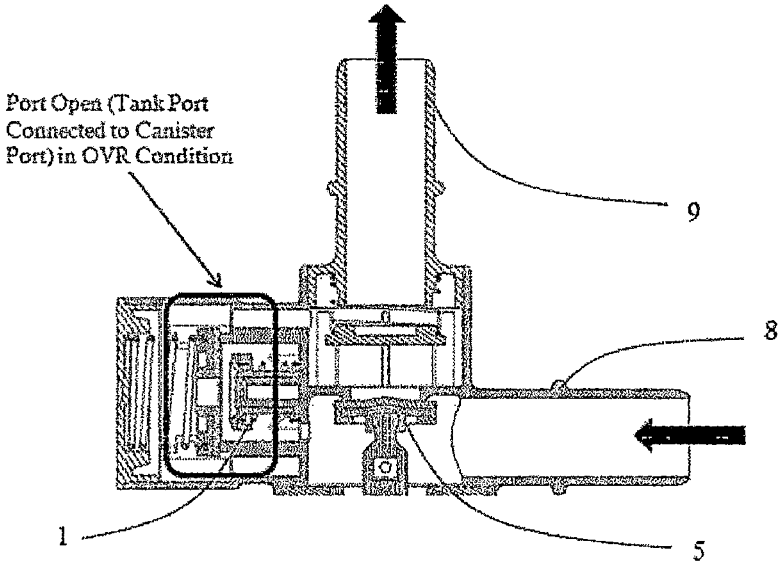
Figure 13:
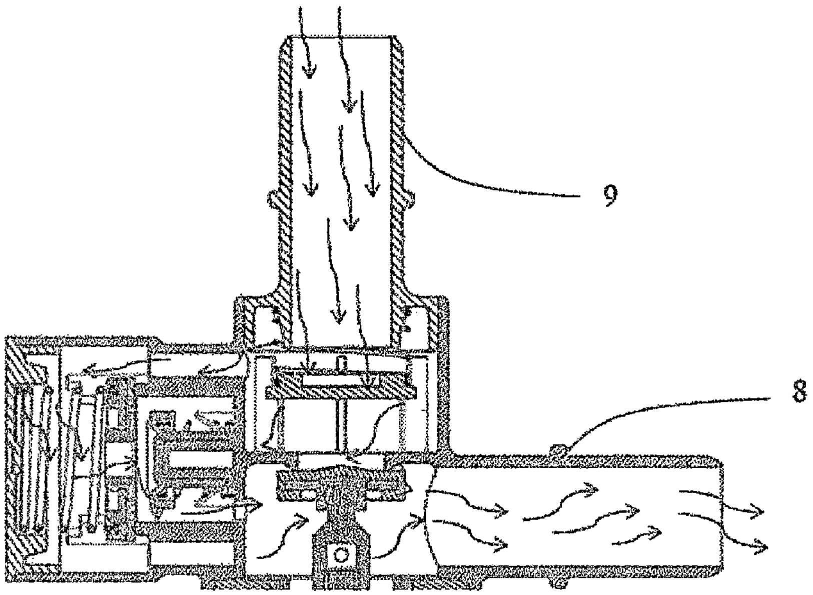

In working over vacuum relief (OVR) condition, vacuum built inside the chamber (7) and the spring (1) keeps the seal (2) in contact with the sealing surface (3) keeping the improved fuel tank isolation valve (100) in closed condition as depicted in FIG. 11. When the vacuum increases beyond the protection point limit, vacuum force compresses the spring (1) and seal OVR (2) moves downwards, due to which the port opens and the flow is permitted from canister port (9) to the tank port (8). During opening vacuum gets released from the tank and again when vacuum come with in safety limit port close down as depicted in FIGS. 12 and 13.

The mechanical opening points in over pressure condition and over relief condition is controlled with the help of separate mechanical compression springs and separate spring for seal sub assembly movement. Due to presence of separate spring, spring with very less load is required. Due to less load requirement, less magnetic force required to pull the seal sub assembly and hence less magnetic force required in solenoid (10).

Therefore, the present invention provides an improved fuel tank isolation valve with separate springs and path of over relief functions i.e. over pressure relief (OPR) and over vacuum relief (OVR) meet the technical requirement of spring within less tolerances and can be adopted in all kind of valves where mechanical opening points of the valve are controlled with the help of compression springs and manufacturing tolerances of other parts are also balanced.

Many modifications and other embodiments of the invention set forth herein will readily occur to one skilled in the art to which the invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

We claim:

1. An improved fuel tank isolation valve (100) comprising:

a seal sub assembly (5);
a sealing (6);
a first chamber (7);
a tank port (8);
a canister port (9);
a solenoid (10);
a moving core (11) operatively connected to the seal sub assembly (5); and
a second chamber (14) configured separately from the first chamber (7);
wherein:
said fuel tank isolation valve is configured to perform an over vacuum relief (OVR) and an over pressure relief (OPR) function;
said second chamber (14) includes an OVR spring (1) for an over vacuum relief function, an OPR spring (4) for an over pressure relief function, an OVR seal (2) associated with OVR spring (1) for said over vacuum relief function, an OPR seal (3) associated with OPR spring (4) for said over pressure relief function to reduce magnetic force generated from said solenoid (10), wherein said OPR seal is separate from the second chamber;
said first chamber (7) holds a pressure or vacuum that is built inside, said OPR spring (4) biases the OPR seal (3) in a first direction towards said OVR seal (2), said OVR spring (1) biases the OVR seal (2) in a second direction opposite to the first direction toward the OPR seal (3), the OVR seal and the OPR seal are directly engageable with one another in an idle closed condition of the improved fuel tank isolation valve (100) closed, said OPR spring (4) compresses and lifts said OVR seal (2) from a first position to a second position to move away from said OPR seal (3) upon an increase in pressure beyond a protection point limit, permitting the flow of vapour from said tank port (8) to said canister port (9) during said over pressure relief function;
said OVR spring (1) compresses and said OPR seal (3) moves to the first position from the second position to move away from said OVR seal (2) upon an increase in vacuum beyond said protection point limit, permitting flow from said tank port (8) to said canister port (9) during said over vacuum relief function; and
said moving core is independently biased by a moving core spring (15) separate from the OVR spring (1) and the OPR spring (4) to keeps the seal sub assembly (5) attached with the surface of the sealing (6) while the improved fuel tank isolation valve (100) is in idle closed condition.

2. The improved fuel tank isolation valve (100) as claimed in claim 1, wherein said improved fuel tank isolation valve (100) includes at least one electrical connector (12) and at least two mounting supports (13).

3. The improved fuel tank isolation valve (100) as claimed in claim 1, wherein said solenoid (10) exerts lesser magnetic force to pull said seal sub assembly (5) because of OVR spring (1), OPR spring (4), and moving core spring (15) for seal sub assembly (5) movement.

4. The improved fuel tank isolation valve (100) as claimed in claim 1, wherein said solenoid (10) is turned ON during refueling and said moving core (11) is shifted downwards causing said seal sub assembly (5) to open and said seal (3) to remain closed because of separate path, said moving core (11) force is greater than said spring (15) force due to magnetic field thereby moving said moving core (11) downwards, said seal sub assembly (5) gets detached from surface of said seal (6), which opens and connects the tank port (8) to canister port (9) at the time of actuation during refueling when working in ON condition.

5. The improved fuel tank isolation valve (100) as claimed in claim 1, wherein said OVR spring (1) keeps said OVR seal (2) in first position and attached with the surface of said OPR seal (3), said OPR spring (4) keeps said OVR seal (2) in first position in contact with surface of said OPR seal (3), and the moving core spring (15) keeps said seal sub assembly (5) upwards and attached with the surface of the sealing (6) which keeps said tank port (8) and said canister port (9) closed till pressure inside reaches a predetermined value.

* * * * *